United States Patent
Howley et al.

(10) Patent No.: US 12,541,354 B2
(45) Date of Patent: Feb. 3, 2026

(54) INFRASTRUCTURE AS CODE (IaC) SERVICE FOR CLOUD PLATFORMS

(71) Applicant: Hewlett Packard Enterprise Development LP, Houston, TX (US)

(72) Inventors: Tom Howley, Galway (IE); Eamonn O'Toole, Galway (IE); Mark Robert Watkins, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 906 days.

(21) Appl. No.: 17/672,658

(22) Filed: Feb. 15, 2022

(65) Prior Publication Data

US 2023/0259390 A1  Aug. 17, 2023

(51) Int. Cl.
*G06F 8/61* (2018.01)
*G06F 8/36* (2018.01)
*G06F 9/50* (2006.01)

(52) U.S. Cl.
CPC .................. *G06F 8/63* (2013.01); *G06F 8/36* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 9,825,823 B2 | 11/2017 | Maes et al. | |
| 10,708,135 B1 | 7/2020 | Elliott, IV | |
| 10,979,320 B2 | 4/2021 | Maes et al. | |
| 2017/0339251 A1 | 11/2017 | Jagannath et al. | |
| 2019/0342166 A1 | 11/2019 | Chaware et al. | |
| 2020/0059420 A1 | 2/2020 | Abraham | |
| 2020/0218579 A1 | 7/2020 | M et al. | |
| 2020/0252271 A1 | 8/2020 | Elliott, IV | |
| 2020/0264897 A1 | 8/2020 | Popo et al. | |

(Continued)

FOREIGN PATENT DOCUMENTS

| | | |
|---|---|---|
| WO | 2019067747 A1 | 4/2019 |
| WO | 2019089443 A1 | 5/2019 |
| WO | 2019113216 A1 | 6/2019 |

OTHER PUBLICATIONS

Agustin Romano, "Infrastructure as Code vs. Infrastructure as Software", Oct. 22, 2020, 5 pages.

(Continued)

*Primary Examiner* — Bing Zhao
(74) *Attorney, Agent, or Firm* — Slater Matsil, LLP

(57) ABSTRACT

Examples described herein relate to providing a simplified interface by a cloud platform to an IaC service. According to an example, operational details associated with multiple infrastructure as code (IaC) tools are abstracted by providing an application programming interface (API) of an IaC service through which multiple IaC templates are available for use to deploy workloads against multiple services within a cloud platform. Each IaC template describes a workload according to an IaC tool and specifies input parameters for the workload. A request to create a deployment based on a particular IaC template is received via the API. The request is satisfied by internally executing the IaC tool associated with the particular template based on parameter values supplied for the specified input parameters for the particular workload.

17 Claims, 5 Drawing Sheets

(56) References Cited

U.S. PATENT DOCUMENTS

2020/0379435 A1    12/2020    El-Qasem
2022/0385663 A1*  12/2022    Baryshnikov ....... H04L 67/1097
2023/0037199 A1*   2/2023    Holzman ............ H04L 41/0843

OTHER PUBLICATIONS

Git, "10.3 Git Internals—Git References", Aug. 8, 2021, 8 pages.
Hashicorp, "Terraform", Aug. 8, 2021, 8 pages, retrieved from internet <https://www.terraform.io/#>.
Progress Software Company, "Chef Software DevOps Automation Solutions", Aug. 8, 2021, 5 pages.
Progress Software Company, "Platform Overview", Aug. 8, 2021, 6 pages.
Pulumi, "Modern Infrastructure as Code", Aug. 8, 2021, 10 pages.
Pulumi, "Pulumi Architecture", Aug. 8, 2021, 8 pages.
Puppet, "Pe software architecture", Aug. 8, 2021, 14 pages.
Puppet, "Powerful infrastructure automation and delivery", Aug. 8, 2021, 7 pages.
Red Hat, Inc., "How Ansible Works", Aug. 8, 2021, 8 pages.
Smartbear Software, "OpenAPI Specification", Aug. 8, 2021, 56 pages.
Steven Terrana, "Introducing the Jenkins Templating Engine!", May 9, 2019, 6 pages.
Wikipedia, "Infrastructure as code", Aug. 8, 2021, 5 pages, retrieved from internet <https://en.wikipedia.org/wiki/Infrastructure_as_code>.

* cited by examiner

INFRASTRUCTURE AS CODE (IaC) SERVICE FOR CLOUD PLATFORMS

BACKGROUND

A public or private cloud service provider may be expected to support Infrastructure as Code (IaC) management of infrastructure. IaC enables automation of the provisioning process through code and facilitates the management and configuration of cloud infrastructure in a repeatable and scalable manner. With IaC, configuration files may be created that contain infrastructure specifications that make it easier to edit and distribute configurations and allow cloud consumers to avoid manual or interactive processes that might otherwise lead to human error or inconsistencies in a deployment.

IaC standards have emerged in the form of tooling that allow cloud service providers to give their customers the above mentioned benefits of IaC. For example, a complex compound deployment against a particular cloud service may be described as a declarative configuration listing the resources to be constructed, which relies on a corresponding IaC tooling engine to handle dependency resolution.

BRIEF DESCRIPTION OF THE DRAWINGS

Aspects described herein are illustrated by way of example, and not by way of limitation, in the figures of the accompanying drawings in which like reference numerals refer to similar elements.

DETAILED DESCRIPTION

Figure 1:
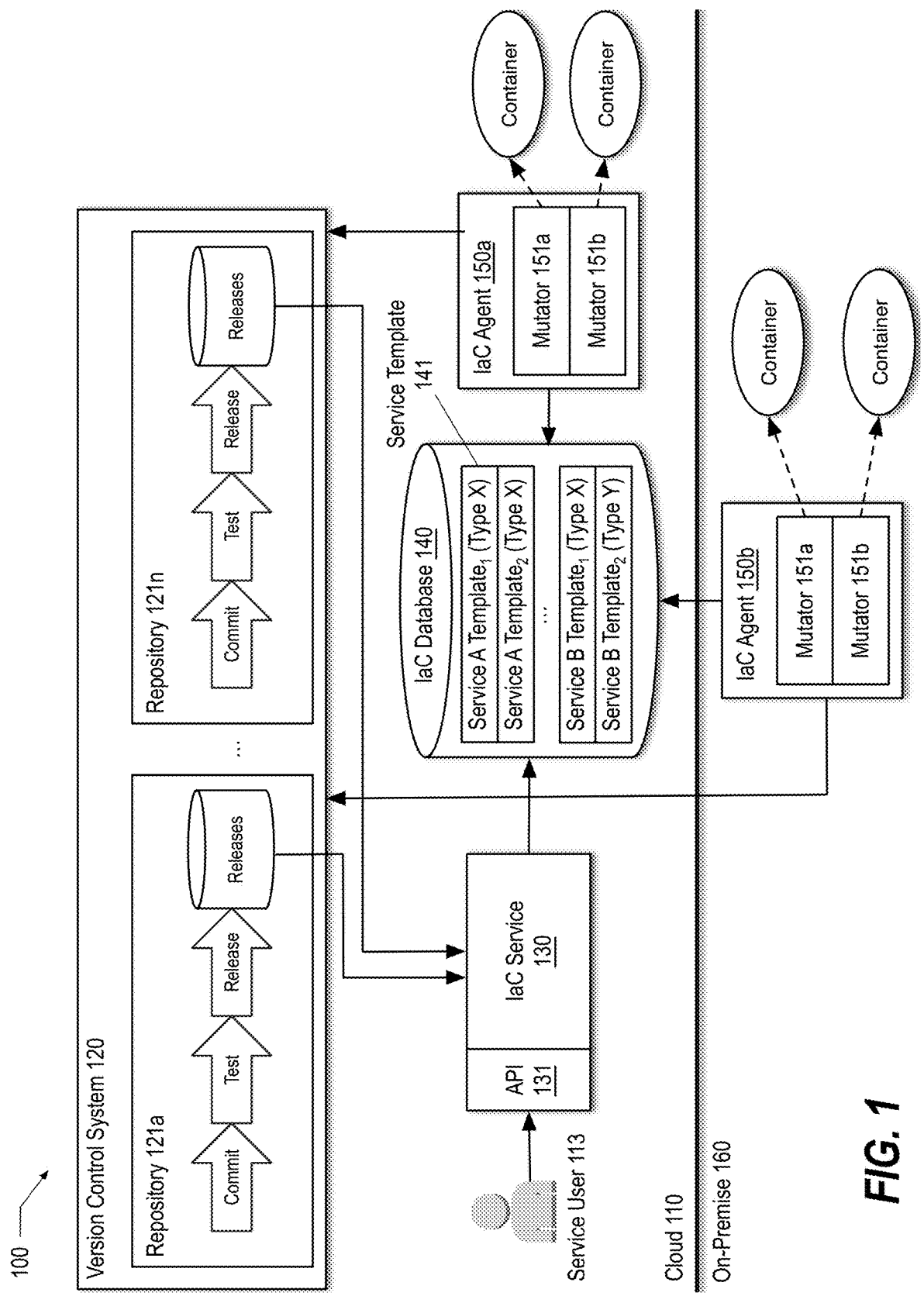
FIG. 1 shows a block diagram of an Infrastructure as Code (IaC) architecture with an IaC service in accordance with an example.

Examples described herein relate to providing a simplified interface by a cloud platform to an IaC service. From the cloud service provider perspective, there are challenges in supporting IaC use cases including the number and complexity of IaC tools and management of the state of deployments created by IaC tools. There are now a considerable number of IaC or configuration management tools on the market (e.g., Terraform produced by HashiCorp®, Pulumi by Pulumi Corporation, Ansible® produced by Red Hat, Inc., Chef® by Progress Software Corporation, and Puppet® produced by Puppet, Inc.). A cloud provider may have to implement plugins and/or provide codified examples for each of these tools in anticipation of what consumers may adopt. This is a particular concern for large cloud platforms comprised of multiple services delivered by different engineering teams and may put pressure on those engineering teams to gain expertise in significantly different IaC methodologies.

The complexity of IaC tools is typically sufficient to result in a significant investment in training and adoption for cloud consumers. Added to this is the fact that the range and behavior of tools are ever-changing. It is not uncommon for consumers of a cloud to wed themselves to a single IaC tool, which can in turn constrain the set of cloud services available to them. In addition to the challenges faced by cloud service providers, the complexity of IaC tools can also place an additional burden on cloud consumers. Typically, the state of deployments created via IaC tooling is assumed to be managed by the users. For example, Terraform provides a Terraform command line interface (CLI) through which state is expected to be persisted to a Terraform state file for ongoing management of resources.

In view of the foregoing, examples described herein seek to provide a simplified IaC interface through which cloud consumers may make use of IaC tools in a manner that abstracts the particular internal IaC tools adopted by the cloud platform. The proposed approach allows cloud service engineers to codify a library of standard interactions with their respective services of a cloud platform according to the appropriate IaC tool of choice and make those templates available via an IaC service, while insulating consumers of the IaC service from the specifics of that IaC tool (including complexities, such as state management). In one example, a deployment may be created by a cloud service user by simply issuing a request to the IaC service for a selected IaC template and providing the input parameters associated with the selected IaC template. As described further below, in one example, operational details associated with multiple IaC tools adopted by a cloud platform may be abstracted by providing an application programming interface (API) of an IaC service through which multiple IaC templates are available for use to deploy workloads against multiple services within the cloud platform. Each IaC template describes a workload according to an IaC tool and specifies input parameters for the workload. A request is received via the API to create a deployment based on a particular IaC template. The request is satisfied by internally executing (e.g., by an IaC agent associated with the IaC service) the IaC tool associated with the particular template based on parameter values supplied for the specified input parameters for the particular workload.

While in the context of various examples described herein a proposed IaC service drives workloads within a private cloud platform (e.g., the HPE Greenlake Edge-to-Cloud Platform available from Hewlett Packard Enterprise Company), it is to be appreciated the methodologies described herein are broadly applicable to use cases in which the IaC service is used to drive workloads within any private cloud, public cloud, or hybrid cloud.

In the following description, numerous specific details are set forth in order to provide a thorough understanding of subject matter disclosed herein. It will be apparent, however, to one skilled in the art that implementation of aspects described herein may be practiced without some of these specific details.

Terminology

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an example," "according to an example," and the like generally mean the particular feature, structure, or characteristic following the phrase is included in at least one example of the present disclosure and may be included in more than one example of the present disclosure. Importantly, such phrases do not necessarily refer to the same example.

The phrase "Infrastructure as Code" or the acronym "IaC" generally refer to the use of code to define infrastructure. While IaC has traditionally involved the use of a custom language or a domain specific language (DSL) of an IaC tool (e.g., Terraform's declarative configuration language, HashiCorp Configuration Language (HCL)) or JavaScript Object Notation (JSON), a recent trend, referred to as "Infrastructure as Software" (IaS) allows the infrastructure to be defined using traditional programming languages (e.g., Python or Golang). As used herein, IaC is intended to refer to IaC and/or IaS.

Example Infrastructure as Code (IaC) Architecture

FIG. 1 shows a block diagram of an Infrastructure as Code (IaC) architecture 100 in accordance with an example. In the context of the present example, IaC architecture 100 includes an IaC service 130, an IaC database 140, and one or more IaC agents 150a-b. The IaC architecture 100 may also include or otherwise be coupled with a version control system 120 (e.g., Git, an open-source version-control system designed to handle very large projects that may be distributed over multiple repositories (e.g., repositories 121a-n)). Depending upon the particular use case, the IaC agent 150a-b may be deployed within a public cloud (e.g., cloud 110) or on-premise 160 in a data center or colocation.

The IaC service 130 may be implemented within a cloud platform (e.g., an as-a-service offering that brings cloud-like flexibility to data centers and other locations, such as satellite and remote offices). In some implementations, infrastructure (not shown) utilized by the cloud platform may be owned by or in possession of a user (e.g., service user 113) or the user's organization and managed by an infrastructure provider (of which the user or user's organization is a customer). In some implementations, the infrastructure may be delivered to the user or user's organization (e.g., installed at a data center or colocation of the user or the user's organization) by the cloud platform vendor or by an infrastructure provider for consumption as-a-service in a pay-per-use financial model. In some implementations, an IaC service 130 described below may be provided by the cloud platform as part of management for consumption as-a-service.

The cloud platform may provide one or more cloud services in an as-a-service manner (e.g., Containers-as-a-Service (CaaS), Virtual Machines-as-a-Service (VMaaS), and/or Bare-Metal-as-a-service (BMaaS)). As described further below, the IaC service 130 may be used by service user 113 to, among other things, issue deployment requests to configure a set of hosts. For example, based on a Terraform template (e.g., a service template within the IaC database 140), a set of bare metal hosts may be configured with an operating system and some basic network configuration.

Version control system 120 may be responsible for tracking changes made to configuration templates (defined according to a particular IaC tool or configuration management tool) for various cloud services offered by the cloud platform within respective dedicated template repositories (e.g., repositories 121a-n). The cloud services offered by the cloud platform may be supported by respective service teams that develop and maintain respective cloud services with API endpoints. Each cloud service team may maintain a set of configuration templates within the dedicated template repositories. For example, a cloud service team for Service A (e.g., a CaaS service) may use repository 121a, a cloud service team for Service B (e.g., a VMaaS service) may use another repository, and a cloud service team for Service N (e.g., a BMaaS service) may use repository 121n. In one example, each template associated with a particular cloud service defines a workload to be deployed against the particular cloud service using the particular IaC tool. When a new template is committed to the repository (e.g., repository 121a-n) it may be put through an automated test process, followed by merging to the repository (assuming a successful test outcome) and the publishing of a new release of the templates repository that includes the new template.

IaC service 130 may be responsible for providing an API 131 to allow the service user 113 to make various requests (e.g., create, apply, update, get status, and destroy) in relation to deployments based on service templates (e.g., service template 141) stored within the IaC database 140. In one example, a new release of templates (e.g., from repositories 121a-n) may be published to the IaC service 130 by invoking an API of the IaC service 130 to add the new templates, which may be in turn persisted in the IaC database 140. As an alternative, a new release of templates may be pulled from the version control system 120 responsive to an IaC watcher service observing changes to the template repositories, which internally uses IaC service 130 to store the new templates.

The persisted template records (e.g., service template 141) may include a reference to the source repository (e.g., one of repositories 121a-b), a version-control system reference (e.g., a git reference), identifying a specific revision when multiple revisions of the same template exist, and a path or name that identifies that template. The inclusion of a version-control system reference in each template provides flexibility. For example, different versions of the same workload can be requested (e.g., different deployments referring to different revisions of the same template). Additionally, the inclusion of a version-control system reference facilitates the creation of workloads based off development branches of a template (typically in a non-production environment).

As described further below, as a result of receiving a request from the service user 113, the IaC service 130 may post a new deployment request (e.g., create, apply, update get status, and destroy) to the IaC database.

IaC agents 150a-b may be responsible for, among other things, watching the IaC database 140 for changes in the current set of deployments and detecting and fetching new deployment requests persisted to the IaC database 140 as a result of requests issued by the service user 113 to the IaC service 130. The watch by the IaC agents 150a-b may be achieved in multiple ways and does not imply that the IaC agents 150a-b have direct access to the IaC database 140. In one example, the IaC service 130 may publish notifications of new requests to a predefined queue or topic and some part of the agent process may be configured to wait for notifications on that queue or topic.

In the context of the present example, the IaC agents 150a-b are shown including mutators 151a-b. The mutators 151a-b may be responsible for managing the launching and orchestration of a particular IaC tool (e.g., Terraform, Pulumi, Ansible, Chef, or Puppet), parsing of that tool's output to determine the outcome or status, and persisting the state of the deployment (e.g., to the IaC database 140) to facilitate future updates via the API 131 and/or to allow the end-user to determine when the deployment has completed.

As described further below with reference to FIG. 2, responsive to observing or otherwise being made aware of a change in the current set of deployments, IaC agent 150a may retrieve the template code associated with the deployment request from the source repository (e.g., repository 121a) and the relevant mutator component (e.g., mutator 151a) may spawn a new container to execute the corresponding IaC tool with the template and input deployment parameters supplied by the service user 113.

The various components (e.g., the version control system 120, the IaC service 130, the IaC database 140, and the IaC agents 150a-b) of the IaC architecture 100 described above with reference to FIG. 1 and the processing described below with reference to the flow diagram of FIG. 2 may be implemented in the form of executable instructions stored on a non-transitory machine readable medium (e.g., a random access memory (RAM), a read-only memory (ROM), an electrically erasable programmable read-only memory (EEPROM), a flash memory, a disk drive, or the like) and executed by a hardware-based processing resource (e.g., a microcontroller, a microprocessor, central processing unit core(s), an application-specific integrated circuit (ASIC), a field programmable gate array (FPGA), or the like) and/or in the form of other types of electronic circuitry. For example, the processing may be performed by one or more computer systems of various forms (e.g., servers, blades, desktop computers, laptop computers), such as the computer system described with reference to FIG. 5 below.

Example Processing by an IaC Architecture

Figure 2:
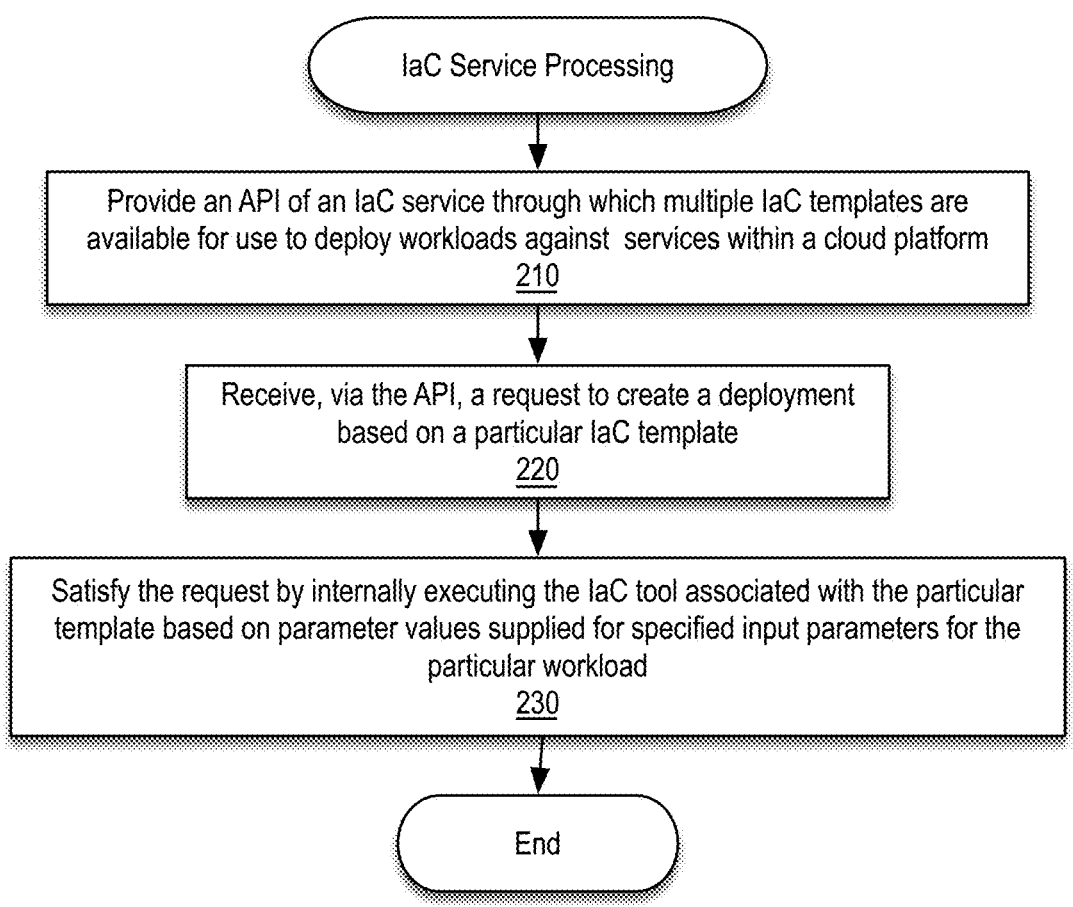
FIG. 2 shows a flow diagram illustrating processing performed by an IaC architecture in accordance with an example.

FIG. 2 shows a flow diagram illustrating processing performed by an IaC architecture in accordance with an example. In the context of the present example, it is assumed a cloud platform (e.g., a cloud platform providing an as-a-service cloud service offerings such as a CaaS service, a VMaaS service, and/or a BMaaS service)) implements an IaC service (e.g., IaC service 130) to process deployment requests issued by an end-user (e.g., service user 113) of the cloud platform.

At block 210, an API (e.g., API 131) is provided for the IaC service. The API may implement methods for creating, applying, updating getting status and/or destroying a deployment. In one example, a catalog of example infrastructure configurations, known as templates, may be codified according to a specific IaC tool (e.g., a catalog of different sets of Terraform configuration files, different sets of Ansible playbooks or templates based on some custom configuration tool). Each template may be accompanied by a parameters file that defines one or more input parameters that can be set by the end-user in order to realize an instance of a particular template. In one example, the set of available templates may be queried via the API. For example, the API may provide a method for listing the available templates (e.g., service template 141) applicable to the cloud services offered by the cloud platform.

Assuming, for sake of example, the cloud platform provides a BMaaS service, the end-user may select a template from the list of available templates to create a deployment based on the selected template. The selected template may represent a Terraform template associated with the BMaaS offering for configuring an operating system and the network configuration of a set of bare metal hosts. While the available templates may include information (e.g., a type field that references the associated IaC tooling to be used for deployments based on the template) to facilitate processing by the appropriate mutator (e.g., mutator 151a-b), depending on the particular implementation, the end-user may or may not be aware of the associated IaC tool and in any event may be abstracted from the operational details of the IaC tools adopted by the cloud platform. In this manner, end-users need not concerns themselves with the complexities of a particular IaC tool and may instead focus on the workload to be deployed against a particular cloud platform service and the input parameters associated with the template for the defined workload.

It is to be appreciated the input parameters associated with a given template may vary based on the workload defined by the template and cloud platform service at issue. Non-limiting examples of input parameters for a VMaaS workload may include the name and location of the virtual machine (VM), the server or cluster of server resources that will run the VM, resource pool, datastore (the location of files associated with the VM), the hardware machine version, guest operating system (OS), the number of virtual processors (e.g., CPUs) in the VM, the type of SCSI adapter to use with the VM, and the disk to use with the VM. Non-limiting examples of input parameters for a CaaS workload may include the launch type on which to run the service, task definition, platform OS, platform version, cluster, service name, scheduling strategy (e.g., replica or daemon), the number of instantiations of the specified task definition to place and keep running on the cluster, deployment configuration (e.g., deployment parameters to control how many task running the deployment and the ordering of stopping and starting tasks), the deployment controller to use for the service, task placement, tags (e.g., metadata to be applied to the service to facilitate categorization and/or organization), and the network configuration for the service. Non-limiting examples of input parameters for a BMaaS workload may include server name, flavor (e.g., CPU, memory, internal disk, RAID controller, power source, NIC), the OS image, the SSH key pair, the IP address for the bare metal server, disk partitioning, RAID level, metadata, and boot mode, and remote console access, and personality (e.g., configuration files).

At block 220, a request to create a deployment based on a particular IaC template (e.g., the selected template) is received via the API. For example, the end-user may invoke a method of the API via a cloud platform client, a Representational State Transfer (REST) client or a CLI of the cloud platform. While in this example, the end-user is described as invoking methods of the API of IaC service to create deployments based on templates of different types (e.g., Terraform, Pulumi, Ansible, Chef, or Puppet), it is to be appreciated various other modes of IaC interaction may be implemented. For example, end-users may write a configuration (e.g., a Terraform configuration based on a Terraform provider of the cloud platform and execute the Terraform command line themselves and/or invoke APIs of the cloud platform directly as described below with reference to FIG. 3.

At block 230, the request is satisfied by internally executing the IaC tool associated with the particular template based on parameter values supplied for specified input parameters for the particular workload. For example, assuming a mode of IaC interaction in which the end-user invokes a method of the API (e.g., via a client of the cloud platform, a Representational State Transfer (REST) client or a CLI of the cloud platform), execution of the method may persist a new deployment request (e.g., create, apply, update get status, or destroy, as the case may be) to an IaC database (e.g., IaC database 140).

In one example, responsive to an IaC agent (e.g., IaC agent 150a) detecting and fetching the new deployment request, the IaC agent may retrieve the template code associated with the deployment request from the source repository (e.g., repository 121a) and may cause the relevant mutator component (e.g., mutator 151a) to spawn a new container to execute the corresponding IaC tool with the template and input deployment parameters supplied by the end-user. Execution of the container may result in one or more calls to the cloud service (e.g., a CaaS service, a VMaaS service, or a BMaaS service, as the case may be) used by the template to deploy the workload it describes. In one example, the state of the deployment is persisted to facilitate future updates via the API. For example, the IaC agent may report the status of the ongoing deployment, including its final status upon completion and persist the state to the IaC database. The end-user may invoke the API to retrieve the current status of its requested deployment and use the results of the call to determine when the deployment has completed.

In one example, the IaC service may also provide a complete audit trail that links an authenticated user with all or a predefined or configurable subset of state changes for a particular deployment. If desired, retrieval requests that result in no state change can also be logged. In this manner, the IaC service may support the performance of audits on the IaC actions taken, for example, to determine the sequence of changes and the users responsible for those changes.

While in the context of the present example, IaC processing is described in the context of a scenario in which the IaC agent represents a hosted cloud service within a cloud (e.g., cloud 110), it is to be appreciated the IaC agent (e.g., IaC agent 150b) may alternatively be hosted in an on-premise environment (e.g., on-premise 160) where it interacts with the hosted IaC service to retrieve deployment requests (directed to that on-premise site) and updates in-progress deployments. This manifestation of the IaC agent may be pertinent to use cases in which the mutator (e.g., one of mutators 151a-b) makes use of access to a local network (e.g., an Ansible playbook that accesses hosts on a private network via the secure shell protocol (SSH)).

While in the context of the example described with reference to FIG. 2, a number of enumerated blocks are included, it is to be understood that other examples may include additional blocks before, after, and/or in between the enumerated blocks. Similarly, in some examples, one or more of the enumerated blocks may be omitted or performed in a different order.

Example Modes of IaC Interaction

Figure 3:
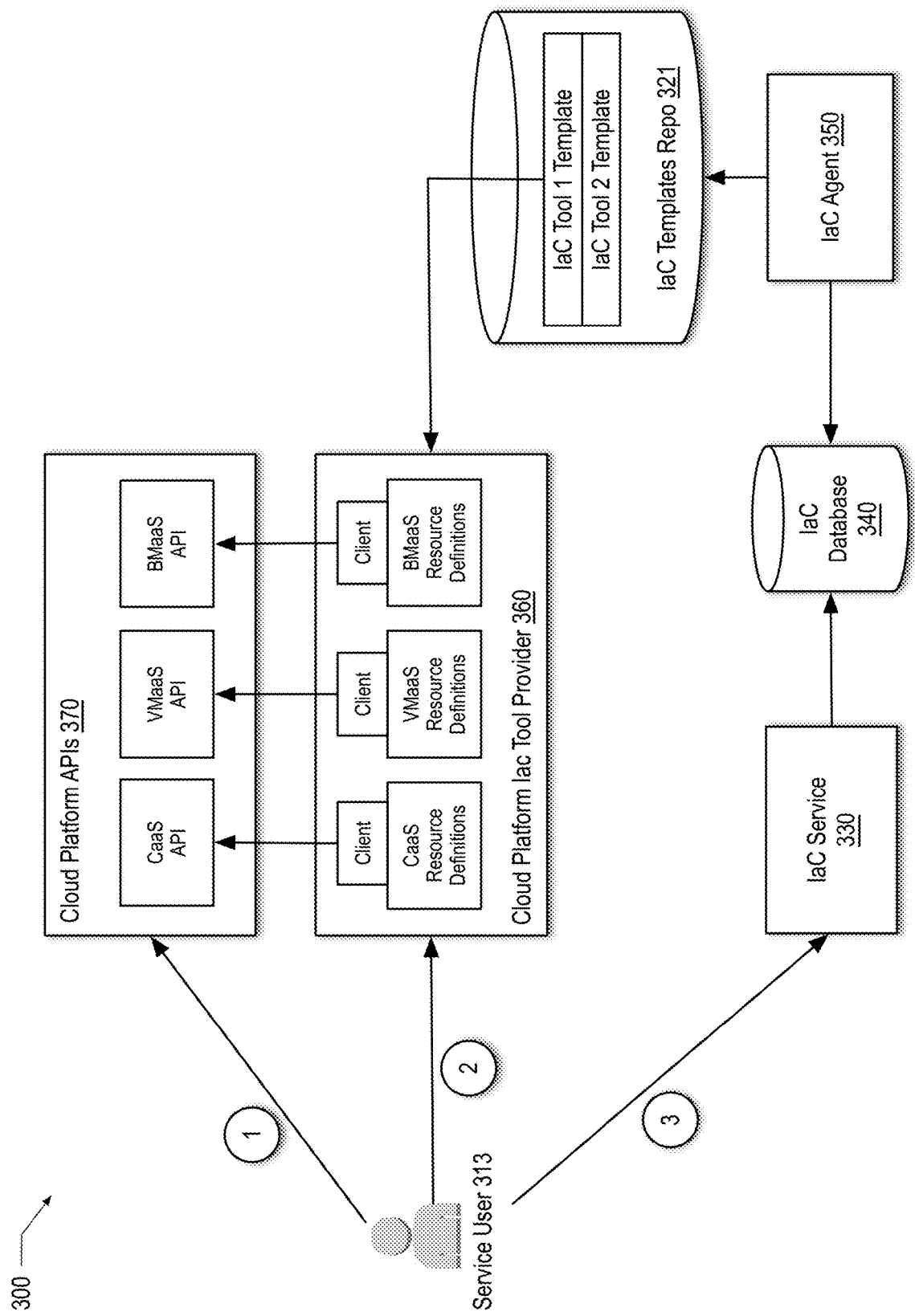
FIG. 3 shows a block diagram illustrating various modes of IaC interaction in accordance with an example.

FIG. 3 shows a block diagram illustrating various modes of IaC interaction in accordance with an example. While the IaC architecture illustrated by FIG. 1 assumes a particular mode of IaC interaction involving the use of an API (e.g., API 131) exposed by an IaC service (e.g., IaC service 130) corresponding to Mode #3 described below, it is to be appreciated other modes of IaC interaction may be supported and the example of FIG. 1 may be modified to operate with another mode. In the context of the present example, three modes of IaC interaction are illustrated including (Mode #1) direct invocation of cloud platform APIs 370, (Mode #2) direct interactions with providers, and (Mode #3) interactions with an API (e.g., API 131) exposed by an IaC service 330, which may be analogous to IAC service 130 of FIG. 1.

In accordance with Mode #1, an end-user (e.g., service user 313) may directly invoke cloud platform APIs 370 (e.g., a CaaS API, a VMaaS API, and/or a BMaaS API) for the respective cloud platform services. In one example, the end-user may use language bindings (e.g., python or Golang) provided by the cloud platform vendor, scripts with curl requests, or the like via a cloud platform client, a REST client, and/or a cloud platform CLI.

In accordance with Mode #2, the end-user may write IaC tool configurations based on a provider for the IaC tool published by the cloud platform vendor. For example, in the context of the present example, the end-user may write a Terraform configuration based on the published cloud platform IaC tool provider 360 (e.g., a Terraform provider) and execute the Terraform command-line themselves. In this example, this mode has a dependency on the cloud platform APIs 370 and clients of the first mode.

In accordance with Mode #3, the end-user may invoke the API of the IaC service 330 (e.g., corresponding to IaC service 130 of FIG. 1) to create deployments based on templates of different types (e.g., Terraform or Ansible). This mode of IaC interaction may involve the use of an IaC database 340 (e.g., corresponding to IaC database 140 of FIG. 1), an IaC agent 350 (e.g., corresponding to one of IaC agent 150a or 150b of FIG. 1), and an IaC templates repository 321 (e.g., corresponding to one of repositories 121a-n of FIG. 1). Mode #3 provides a consistent simplified interface for creating workloads across various cloud platform services and abstracts operational details of the IaC tools adopted by the cloud platform by allowing the user to select a desired template and specify values for associated input parameters rather than involving the end-user in the creation and/or editing of configuration files for the underlying IaC tools. As illustrated by FIG. 3, Mode #3 also abstracts the end-user from IaC tool provider interfaces (e.g., interfaces of the cloud platform Terraform provider 360) and cloud platform APIs 370.

Various components (e.g., the could platform IaC tool provider 360, the IaC service 330, and the IaC agent 350) of the IaC service 300 described above with reference to FIG. 3 may be implemented in the form of executable instructions stored on a non-transitory machine readable medium (e.g., a random access memory (RAM), a read-only memory (ROM), an electrically erasable programmable read-only memory (EEPROM), a flash memory, a disk drive, or the like) and executed by a hardware-based processing resource (e.g., a microcontroller, a microprocessor, central processing unit core(s), an application-specific integrated circuit (ASIC), a field programmable gate array (FPGA), or the like) and/or in the form of other types of electronic circuitry. For example, the processing may be performed by one or more computer systems of various forms (e.g., servers, blades, desktop computers, laptop computers), such as the computer system described with reference to FIG. 5 below.

Example IaC Service Use Cases

Figure 4:
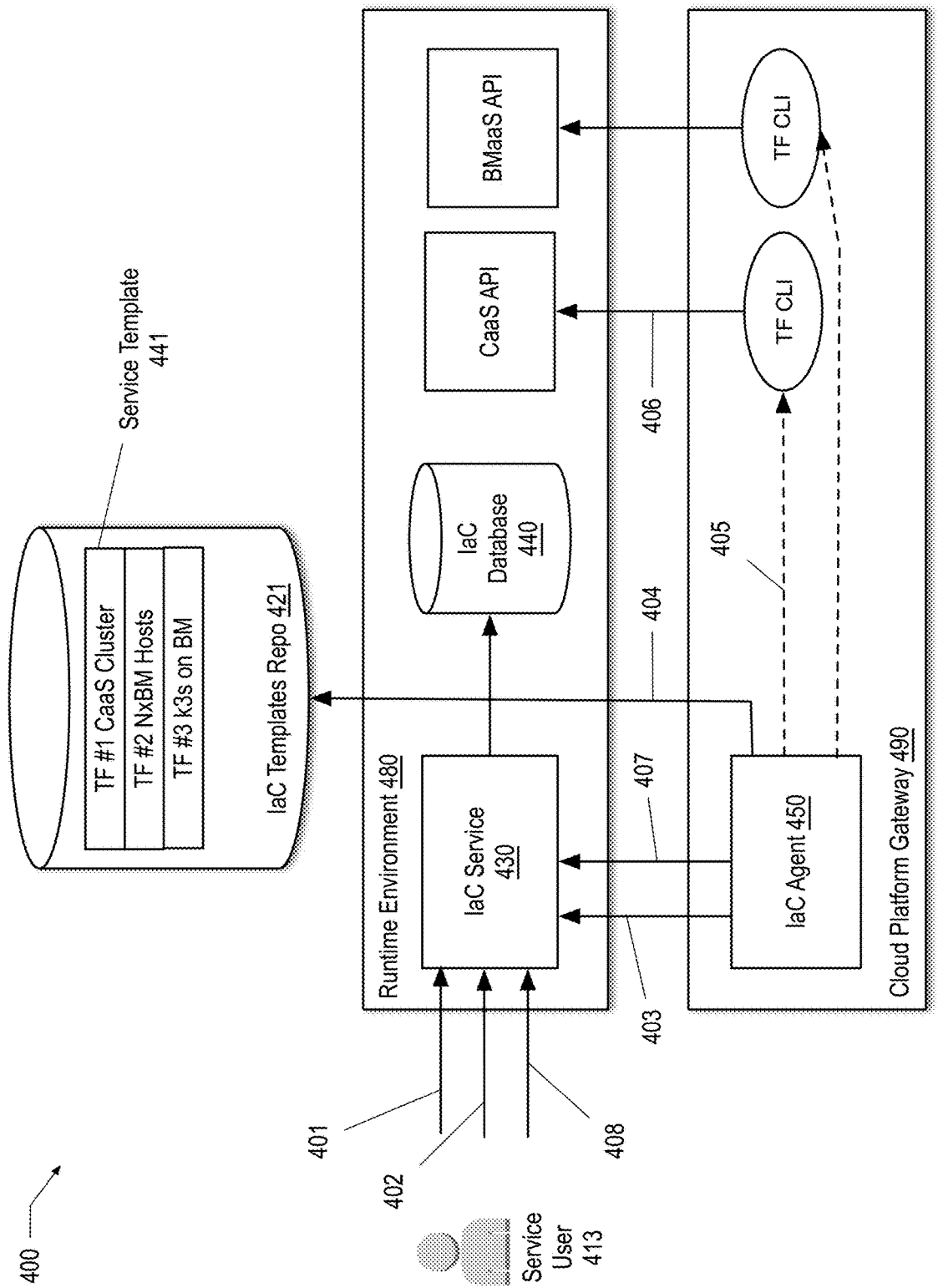
FIG. 4 shows a block diagram illustrating an IaC service implemented in a private cloud platform in accordance with an example.

FIG. 4 shows a block diagram illustrating an IaC service implemented in a private cloud platform 400 in accordance with an example. In the context of the present example, the private cloud platform 400 is shown including a runtime environment 480 and a cloud platform gateway 490. In one example, the runtime environment 480 is a Software-as-a-Service (SaaS)/hosted runtime environment, such as a hosted Kubernetes cluster (e.g., an on-premise Kubernetes environment, Amazon Elastic Kubernetes Service (EKS), Azure Kubernetes Service (AKS), or Google Kubernetes Engine (GKE)).

In the context of the present example, an IaC service 430 (e.g., analogous to IaC service 130 of FIG. 1) and IaC database 440 (e.g., analogous to IaC database 140 of FIG. 1) may be hosted on the runtime environment 480 while an IaC agent 450 (e.g., analogous to IaC agent 150a or 150b of FIG. 1) is hosted on the cloud platform gateway 490 and drives the cloud platform APIs 370 according to the requested templates (e.g., a Terraform template in the context of the present example). In alternative implementations, the IaC agent 350 may also be hosted within the runtime environment 480.

For purposes of illustration, a non-limiting use case will now be described with reference to FIG. 4. For purposes of the following use case, it is assumed a service team user (not shown) that is a member of a VMaaS team that is familiar with a particular IaC standard (e.g., Terraform (an IaC standard) and has written some sample Terraform configurations to create workloads on a VMaaS service instance. The service team user may make those sample Terraform configurations available to an end-user (e.g., service user 413) via an API (e.g., API 131) of the IaC service 430, without that end-user having to know how to operate Terraform. Similarly, a member of the BMaaS team may have written a sample Terraform configuration to deploy a set of bare-metal hosts and an Ansible playbook to deploy a particular application configuration upon those provisioned hosts. That deployment sequence can be made available to the end-user by making the Terraform and Ansible templates available through the API of the IaC service 430 (and through the use of chaining to allow one deployment be linked to another as described further below).

In some examples, an end-user that is proficient in a particular IaC tool standard can also be provided with the ability to upload their own templates. For example, the end-user could write their own Terraform configuration against a CaaS service, commit that configuration to a version control system (e.g., version control system 120) and then create a template (e.g., of type Terraform) via the API (e.g., API 131) of the IaC service (e.g., IaC service 130) where that template points to the version control system reference of the Terraform configuration. That template is then available in the catalog for that end-user or other end-users in the same customer tenant to consume.

A non-limiting step-by-step flow providing additional details for the above use case includes the end-user making an API request (at 401) to create a deployment based on the TF #1 template (one of a number of available service templates 441, which may each provide for deploying different workloads), supplying the parameter values for that template. This deployment is in turn persisted in the IaC database 440.

The end-user may then make an API request (at 402) to apply the previously created deployment, which results in the IaC service 430 persisting an apply operations (Ops) request in the IaC database 440.

An on-premise IaC agent (e.g., IaC agent 450) may periodically poll (at 403) for Ops requests for this site/location or an event-driven mechanism may inform the IaC agent of the present of a new Ops request (a deployment request).

Responsive to the IaC agent determining (or otherwise being informed of) the presence of the new Ops request, the IaC agent retrieves the associated Terraform configuration for the deployment (at 404).

As in the context of the present example, the deployment is of type Terraform, the Terraform mutator component (e.g., one of mutators 151a-b of FIG. 1) of the IaC agent launches a container (at 405) to execute the retrieved Terraform configuration.

The container runs Terraform, for example, based on a cloud platform Terraform provider (e.g., cloud platform IaC tool provider 360) at 406, which results in CaaS API calls to provision a CaaS tenant cluster.

The IaC Agent sets the status of deployment (at 407) via calls back to the hosted IaC service 430 (e.g., via the API). The Terraform state associated with this deployment may also be persisted in the IaC database by the IaC service 430.

The end-user makes API calls (at 408) to retrieve the current status of the deployment (e.g., to view the progress of the requested CaaS workload).

The end-user may repeat the above steps with a BMaaS Terraform template (e.g., TF #2 within the IaC templates repository 421) to provision a set of bare-metal hosts.

Chaining Deployments

As noted above, an IaC service (e.g., IaC service 130 of FIG. 1) may also allows a user to chain one or more deployment requests, whereby the outputs of one completed deployment are used as inputs for a subsequent deployment. For example, different IaC tooling can be chained together (e.g., Terraform or Pulumi can be used to deploy infrastructure and Ansible or Chef or Puppet can subsequently be used to run post-deployment configuration tasks. More specifically, a first deployment of a chain could be based on a Terraform template to configure a set of bare-metal hosts with an operating system and some basic network configuration. The output of the first deployment, including the assigned IP addresses for each host could then be used as input to a subsequent deployment based on an Ansible playbook to install and configure application software on the provisioned bare-metal hosts (as the Ansible playbooks may make use of the IP addresses to SSH onto the nodes). Furthermore, the first deployment could have been managed via a cloud-hosted IaC agent (e.g., IaC agent 150a of FIG. 1) with a Terraform mutator, whereas the second deployment could be managed via an on-premise IaC agent (e.g., IaC agent 150b of FIG. 1) with an Ansible mutator.

Generic Service Templates

In the above examples, definition of standard templates has been described in which a given template describes a specific workload based on some subset of the resources provided by the cloud service API. The associated parameter list for such a template establishes the constraints of the workload description and allows for a simplified means of workload deployment for an IaC service consumer.

A further enhancement to the examples described herein may involve the use of generic service templates. A generic service template is one that exposes all available resources for a cloud service in a single template. That is, the associated parameters file is an exhaustive list of all tunable settings across the cloud service API. Therefore, each cloud service should only have one generic service template (of a specific type). The purpose of such a generic template would be to support the expert user that wishes to have more flexibility in workload creation. As will be appreciated, by definition, any deployment created from a standard (or concrete) template described above can also be created via the generic service template mechanism; however, the increased flexibility potentially exposes the user to the possibility of encountering errors by specifying an invalid workload composition, so there is merit in supporting either or both modes of operation depending upon the goals of the particular implementation. In one example, assuming the cloud service API is defined in a standard specification language such as the OpenAPI Specification (formerly known as Swagger), a generic service template may be automatically generated.

Example Computer System

Figure 5:
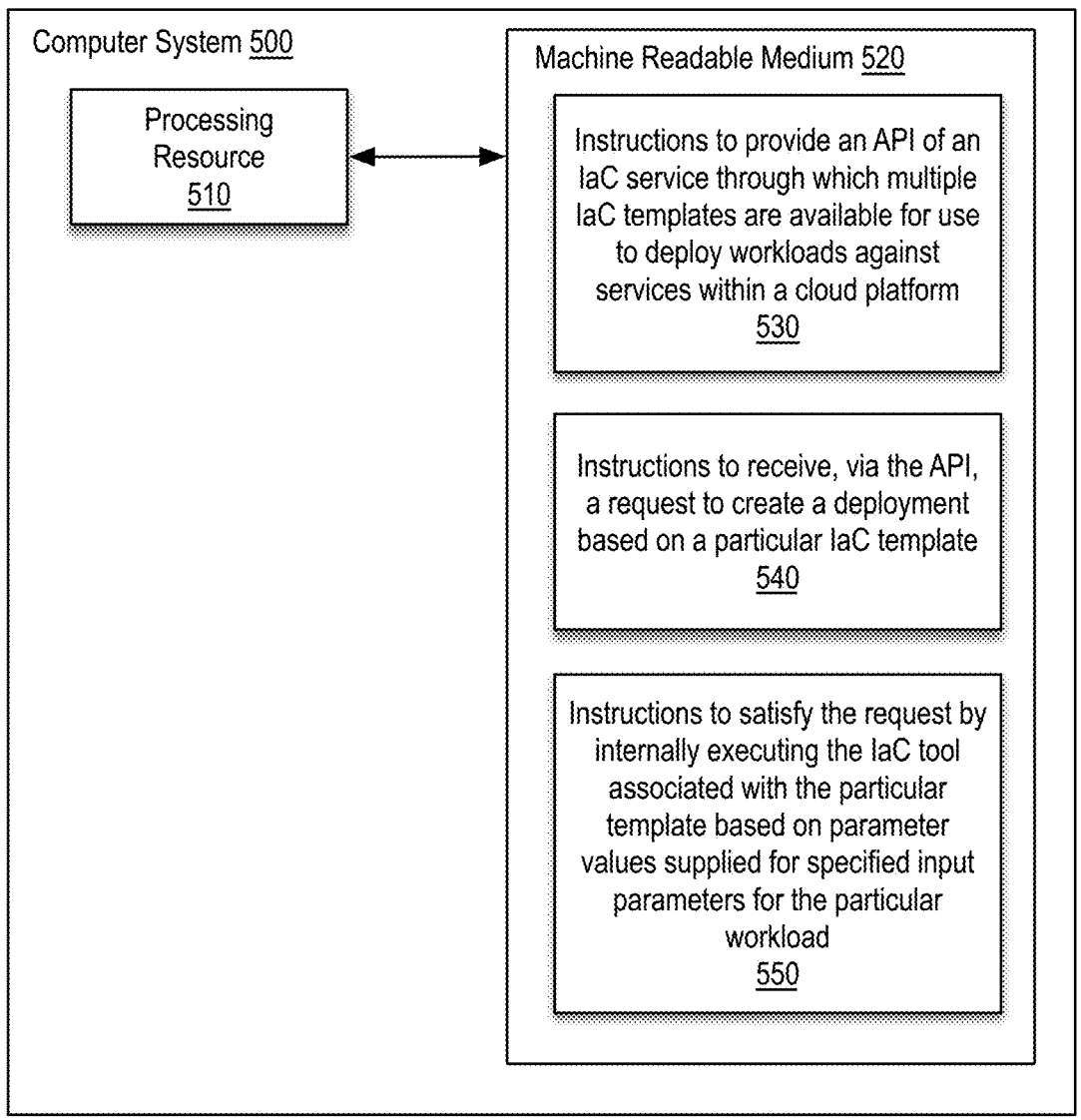
FIG. 5 shows a block diagram of a computer system in accordance with an example.

FIG. 5 shows a block diagram of a computer system in accordance with an example. In the example illustrated by FIG. 5, computer system 500 includes processing resource 510 coupled to non-transitory, machine readable medium 520 encoded with instructions to perform one or more processes described herein. Computer system 500 may be a server, a cluster of servers, a computer appliance, a workstation, a converged system, a hyperconverged system, or the like. Computer system 500 may represent an example of a computing device that may perform one or more of the methods described herein and/or may represent an example of infrastructure provisioned, configured, and/or managed by the IaC service described herein. Depending upon the particular implementation, system 500 may be in a cloud (e.g., cloud 110) and in communication with the infrastructure to be provisioned, configured, and/or managed or may be a management server within the same data center as the infrastructure to be managed.

Processing resource 510 may include a microcontroller, a microprocessor, CPU core(s), GPU core(s), an ASIC, an FPGA, and/or other hardware device suitable for retrieval and/or execution of instructions from machine readable medium 520 to perform the functions related to various examples described herein. Additionally, or alternatively, processing resource 510 may include electronic circuitry for performing the functionality of the instructions described herein.

Machine readable medium 520 may be any medium suitable for storing executable instructions. Non-limiting examples of machine readable medium 520 include RAM, ROM, EEPROM, flash memory, a hard disk drive, an optical disc, or the like. The machine readable medium 520 may be a non-transitory medium, where the term "non-transitory" does not encompass transitory propagating signals. Machine readable medium 520 may be disposed within computer system 500, as shown in FIG. 5, in which case the executable instructions may be deemed "installed" or "embedded" on computer system 500. Alternatively, machine readable medium 520 may be a portable (e.g., external) storage medium, and may be part of an "installation package." The instructions stored on machine readable medium 520 may be useful for implementing at least part one or more of the methods described herein.

In the context of the present example, machine readable medium 520 is encoded with a set of executable instructions 530-550. It should be understood that part or all of the executable instructions and/or electronic circuits included within one block may, in alternate implementations, be included in a different block shown in the figures or in a different block not shown.

Instructions 530, upon execution, may cause processing resource 510 to provide an API (e.g., API 131) of an IaC service (e.g., IaC service 130) through which multiple IaC templates are available for use to deploy workloads against services within a cloud platform. Each of the IaC templates describes a workload according to an IaC tool of a plurality of IaC tools and specifies input parameters for the workload. The API thus abstracts operational details associated with the plurality of IaC tools. In one example, instructions 530 may be useful for performing block 210 of FIG. 2.

Instructions 540, upon execution, may cause processing resource 510 to receive, via the API, a request to create a deployment based on a particular IaC template. In one example, instructions 540 may be useful for performing block 220 of FIG. 2.

Instructions 550, upon execution, may cause processing resource 510 satisfy the request by internally executing the IaC tool associated with the particular template based on parameter values supplied for specified input parameters for the particular workload. In one example, instructions 550 may be useful for performing block 230 of FIG. 2.

In the foregoing description, numerous details are set forth to provide an understanding of the subject matter disclosed herein. However, implementation may be practiced without some or all these details. Other implementations may include modifications and variations from the details discussed above. It is intended that the following claims cover such modifications and variations.

What is claimed is:

1. A method comprising:
abstracting operational details associated with a plurality of infrastructure as code (IaC) tools by providing an application programming interface (API) of an IaC service through which a plurality of IaC templates are available for use to deploy workloads against a plurality of services within a cloud platform;
receiving, from a user and via the API, a chain deployment request to deploy a workload within the cloud platform,
wherein:
the chain deployment request comprises:
a first selection of a first IaC template of the plurality of IaC templates, wherein the first IaC template is associated with a first IaC tool of the plurality of IaC tools;
parameter values corresponding to first input parameters specified by the first IaC template, and
a second selection of a second IaC template of the plurality of IaC templates, wherein the second IaC template is associated with a second IaC tool of the plurality of IaC tools,
the first IaC template comprises:
a first description of a first portion of the workload;
a first specification of the first input parameters to be used for deploying the first portion of the workload; and
a first reference to a first location in a repository comprising first template code for deploying the first portion of the workload, and the second IaC template comprises:
  a second description of a second portion of the workload,
  a second specification of second input parameters for deploying the second portion of the workload, and
  a second reference to a second location in the repository comprising second template code for deploying the second portion of the workload;
obtaining the first template code based on the first reference included in the first IaC template;
executing, within the cloud platform, the first IaC tool using the first template code from the first location in the repository and the parameter values to deploy the first portion of the workload;
obtaining a set of outputs corresponding to the first portion of the workload;
obtaining the second template code based on the second reference included in the second IaC template; and
executing, within the cloud platform, the second IaC tool using the second template code and the set of outputs as at least a portion of the second input parameters to deploy the second portion of the workload within the cloud platform.

2. The method of claim 1, further comprising, prior to receiving, via the API, the chain deployment request:
receiving, via the API, a list request to list the plurality of IaC templates.

3. The method of claim 1, further comprising internally persisting state information associated with the workload.

4. The method of claim 1, further comprising:
receiving, via the API, a creation request to create new IaC template of the plurality of IaC templates including new template code associated with the new IaC template; and
responsive to the creation request, inserting the new IaC template into the repository.

5. The method of claim 1, wherein the plurality of IaC tools are of different vendors.

6. The method of claim 1, wherein the plurality of services includes a virtual machine as-a-service (VMaaS), a container as-a-service (CaaS), or a bare metal as-a-service (BMaaS).

7. A system comprising:
a processing resource; and
a non-transitory computer-readable medium, coupled to the processing resource, having stored therein instructions that when executed by the processing resource cause the processing resource to:
  abstract operational details associated with a plurality of infrastructure as code (IaC) tools by providing an application programming interface (API) of an IaC service through which a plurality of IaC templates are available for use to deploy workloads against a plurality of services within a cloud platform,
  receive, from a user and via the API, a chain deployment request to deploy a workload within the cloud platform,
  wherein:
    the chain deployment request comprises:
      a first selection of a first IaC template of the plurality of IaC templates, wherein the first IaC template is associated with a first IaC tool of the plurality of IaC tools;
      parameter values corresponding to first input parameters specified by the first IaC template, and
      a second selection of a second IaC template of the plurality of IaC templates, wherein the second IaC template is associated with a second IaC tool of the plurality of IaC tools,
    the first IaC template comprises:
      a first description of a first portion of the workload;
      a first specification of the first input parameters to be used for deploying the first portion of the workload; and
      a first reference to a first location in a repository comprising first template code for deploying the first portion of the workload and
    the second IaC template comprises:
      a second description of a second portion of the workload,
      a second specification of second input parameters for deploying the second portion of the workload, and
      a second reference to a second location in the repository comprising second template code for deploying the second portion of the workload;
  obtain the first template code based on the first reference included in the first IaC template;
  execute, within the cloud platform, the first IaC tool using the first template code from the first location in the repository and the parameter values to deploy the first portion of the workload;
  obtain a set of outputs corresponding to the first portion of the workload;
  obtain the second template code based on the second reference included in the second IaC template; and
  execute, within the cloud platform, the second IaC tool using the second template code and the set of outputs as at least a portion of the second input parameters to deploy the second portion of the workload within the cloud platform.

8. The system of claim 7, wherein the instructions further cause the processing resource to:
receive, prior to receiving the chain deployment request and via the API, a list request to list the plurality of IaC templates.

9. The system of claim 7, wherein the instructions further cause the processing resource to internally persist state information associated with the workload.

10. The system of claim 7, wherein the instructions further cause the processing resource to:
receive, via the API, a creation request to create a new IaC template of the plurality of IaC templates including new template code associated with the new IaC template; and
responsive to the creation request, insert the new IaC template into the repository.

11. The system of claim 7, wherein the plurality of IaC tools are of different vendors.

12. The system of claim 7, wherein the plurality of services includes a virtual machine as-a-service (VMaaS), a container as-a-service (CaaS), or a bare metal as-a-service (BMaaS).

13. A non-transitory machine-readable medium storing instructions, which when executed by a processing resource of a computer system, cause the processing resource to:
abstract operational details associated with a plurality of infrastructure as code (IaC) tools by providing an application programming interface (API) of an IaC service through which a plurality of IaC templates are available for use to deploy workloads against a plurality of services within a cloud platform,
receive, from a user and via the API, a chain deployment request to deploy a workload within the cloud platform, wherein:
the chain deployment request comprises:
a first selection of a first IaC template of the plurality of IaC templates, wherein the first IaC template is associated with a first IaC tool of the plurality of IaC tools;
parameter values corresponding to first input parameters specified by the first IaC template, and
a second selection of a second IaC template of the plurality of IaC templates, wherein the second IaC template is associated with a second IaC tool of the plurality of IaC tools,
the first IaC template comprises:
a first description of a first portion of the workload;
a first specification of the first input parameters to be used for deploying the first portion of the workload; and
a first reference to a first location in a repository comprising first template code for deploying the first portion of the workload, and
the second IaC template comprises:
a second description of a second portion of the workload,
a second specification of second input parameters for deploying the second portion of the workload, and
a second reference to a second location in the repository comprising second template code for deploying the second portion of the workload;
execute, within the cloud platform, the first IaC tool using the first template code from the first location in the repository and the parameter values to deploy the first portion of the workload,
obtain a set of outputs corresponding to the first portion of the workload;
obtain the second template code based on the second reference included in the second IaC template; and
execute, within the cloud platform, the second IaC tool using the second template code and the set of outputs as at least a portion of the second input parameters to deploy the second portion of the workload within the cloud platform.

14. The non-transitory machine-readable medium of claim 13, wherein the instructions further cause the processing resource to:
receive, prior to receiving the chain deployment request and via the API, a list request to list the plurality of IaC templates.

15. The non-transitory machine-readable medium of claim 14, wherein the instructions further cause the processing resource to internally persist state information associated with the workload.

16. The non-transitory machine-readable medium of claim 14, wherein the instructions further cause the processing resource to:
receive, via the API, a creation request to create a new IaC template of the plurality of IaC templates including new template code associated with the new IaC template; and
responsive to the creation request, insert the new IaC template into the repository.

17. The non-transitory machine-readable medium of claim 14, wherein the plurality of services includes a virtual machine as-a-service (VMaaS), a container as-a-service (CaaS), or a bare metal as-a-service (BMaaS).

* * * * *